United States Patent [19]
Bedarida

[11] Patent Number: 5,937,170
[45] Date of Patent: Aug. 10, 1999

[54] DATA COMMUNICATIONS WITH PROCESSOR-ASSERTABLE ADDRESSES MAPPED TO PERIPHERAL-ACCESSIBLE-ADDRESSES-TIMES-COMMAND PRODUCT SPACE

[75] Inventor: Alessandro Bedarida, Santa Clara, Calif.

[73] Assignee: VLSI Technology, Inc., San Jose, Calif.

[21] Appl. No.: 08/804,342

[22] Filed: Feb. 21, 1997

[51] Int. Cl.$^6$ .............................. G06F 3/00; G06F 13/00; G06F 12/02

[52] U.S. Cl. ........................ 395/280; 395/309; 711/202

[58] Field of Search .................................. 395/280, 281, 395/309; 711/206, 207, 202; 370/402

[56] References Cited

U.S. PATENT DOCUMENTS

| | | | |
|---|---|---|---|
| 4,315,310 | 2/1982 | Bayliss et al. | 395/823 |
| 4,535,404 | 8/1985 | Skenk | 395/879 |
| 5,548,746 | 8/1996 | Carpenter et al. | 395/500 |
| 5,640,528 | 6/1997 | Harney et al. | 711/206 |
| 5,699,542 | 12/1997 | Mehta et al. | 711/202 |

OTHER PUBLICATIONS

Gillig, James R. "Endian–Neutral Software, Part 1" Dr. Dobb's Journal, Oct., 1994, pp. 62, 64, 68–70.

James, David V., "Multiplexed Buses: The Endian Wars Continue", IEEE, Jun. 1990, pp. 9–21.

*Primary Examiner*—Gopal C. Ray
*Attorney, Agent, or Firm*—Clifton L. Anderson

[57] ABSTRACT

A computer system includes a microprocessor running in big-endian mode and both big-endian and little-endian peripherals, including a little-endian SCSI controller that controls a hard disk. When a program calls for a data transfer between the hard disk and random-access memory, the operating system determines a peripheral-accessible memory address range for the data transfer. A bridge driver intercepts this range and determines whether or not the data needs to be swizzled to take into account differing endianness. The determination is encoded into the most significant bit of a processor-assertable address range, and the bits of lesser significance indicate the peripheral-accessible address range. The processor-assertable address range is conveyed to the SCSI controller originating the data transfer. A communications bridge extracts the processor-assertable address from the origination information from the SCSI controller. The bridge maps the processor-assertable address range to a product space of peripheral-accessible addresses and a command set. The mapping indicates the peripheral-accessible address range intended by the operating system and an indication that swizzling need to be performed. In addition, the second most significant bit of the processor-assertable address is used to indicate that cache snooping is required for the transfer. The invention efficiently allows peripherals designed for one endian environment to work in a different endian environment.

8 Claims, 3 Drawing Sheets

DATA COMMUNICATIONS WITH PROCESSOR-ASSERTABLE ADDRESSES MAPPED TO PERIPHERAL-ACCESSIBLE-ADDRESSES-TIMES-COMMAND PRODUCT SPACE

BACKGROUND OF THE INVENTION

The present invention relates to computer systems and, more particularly, to communications between computer system components. A major objective of the invention is to facilitate communications between computer system components where the components employ diverse byte-ordering conventions.

Society has been revolutionized by the rapid development of computer technology. A computer typically comprises an execution unit (e.g., one or more microprocessors), storage for programs and data (RAM, hard disk, etc.), and peripherals (displays, keyboards, modems, printers, etc.). As computers have become more powerful and affordable, the range of applications they serve has continually broadened. With this broadening base of applications has come the desirability of connecting greater numbers and a greater variety of peripherals.

Rather than use separate dedicated interfaces for each peripheral, most modern computers implement buses that allow several peripherals to communicate with a microprocessor, provided the peripherals conform to the bus form factor and protocol. Until recently, most buses were practically exclusive to a particular computer platform: e.g., Macintosh computers used a NuBus bus, while DOS-Windows computers used variants of an ISA (Industry Standard Architecture) bus. Due to hardware and software differences between buses, considerable work was required to adapt a product designed for one platform to another platform.

More recently, buses are being adopted across platforms. For example, the PCI (Peripheral Component Interface) bus is already used on Windows and Macintosh systems. In addition, Futurebus+ (IEEE P896.1), SCI (Scalable Coherent Interface), Serialbus ("Firewire", IEEE 1394), and USB (Universal Serial Bus) are expected to be cross platform. These buses promise to reduce development costs for peripheral manufacturers and system integrators, since a single item of hardware can be adapted to different platforms simply by using different software drivers.

Clouding the promise of peripherals that are interchangeable between platforms are the different byte-ordering conventions used by different microprocessors. A byte is a unit of data equal to eight bits. Most modern microprocessors deal with data in units, e.g., words, of data, that are an integer number of bytes long. Thus, 16-bit microprocessors deal with words that are two-bytes long, 32-bit microprocessors deal with four-byte words, and so on.

Byte order is an issue for a microprocessor which can address memory in sub-word-sized units. When a word-wide load is performed in a little-endian system, the byte with the lowest address is loaded into the least significant portion of a word-length register in the microprocessor. In a big-endian system, the byte with the lowest address is loaded into the most significant portion of a word-length register. Most microprocessors are either little endian or big endian. However, there are also mixed-endian processors (VAX floating point unit) and endian-selectable processors (PowerPC).

While each type of endianness has its advantages, the existence of the different types complicates communications in cross-platform environments. An analogy would be the merger of a right-hand drive country with a left-hand drive country: one can drive on either side of a road; however, switching back and forth can be problematic. Likewise, communication between, for example, a little-endian peripheral and a big-endian processor can be problematic. One typical scenario has the MacOS operating system running on a PowerPC processor that accesses little-endian peripherals over a PCI bus.

When a little-endian PCI peripheral transfers data to memory in four-byte chunks, memory stores the first byte as the least significant byte, which does not meet the expectation of a big-endian microprocessor. Presumably, the program operating the computer system can determine the endianness of the peripheral and of the processor and reorder the bytes as they are transferred. This reordering is referred to as "swizzling".

Having the microprocessor attend to this low-level task for the entire transfer can impair performance. To maximize performance, some bus-mastering peripherals take over a bus in accordance with a bus-arbitration protocol to effect a direct memory access (DMA). During a DMA transfer, the microprocessor is not in a position to swizzle the data. An alternative is to transfer the data without swizzling, and swizzle the data in memory after the transfer is complete. For transfers from memory, the swizzling can be done before the transfer. Swizzling data in memory allows the microprocessor some flexibility in scheduling the swizzling task, but still imposes a burden on the microprocessor, especially when large amounts of data are transferred.

To avoid burdening the microprocessor, it would be desirable to off-load the swizzle function to a communications bridge between memory and the bus over which the data transfer is to be made. The microprocessor could inform the bridge that a little-endian peripheral is transmitting data, but the data is to be swizzled so that it is stored in memory in a big-endian format. Once the swizzle instruction is sent, the microprocessor could attend to other matters.

This approach is not practical for the common situation in which a bus is handling transfers from plural peripherals at once. To allow practically concurrent data transfers, data is divided into small packets. Packet communications concerning different peripherals are time-multiplexed by the bus. In such a situation, the microprocessor cannot determine the source of any given packet. Thus, the microprocessor cannot make a determination of whether or not to swizzle.

If each data packet indicated the peripheral initiating its transfer, it would be possible, in principle, for the bridge to make the determination of whether or not to swizzle. However, several well-established bus protocols, e.g., PCI, fail to identify the master that initiates the data transfer. Thus, the communications bridge cannot determine the endianness of the source peripheral.

Accordingly, for the common situation in which the bus protocol does not require an initiating peripheral to be identified in a data packet, there has been no effective way to off-load the swizzle function from the microprocessor. Therefore, the swizzle function imposes a significant penalty on processor performance. What is needed is a less processor-intensive scheme for handling mixed-endian environments.

SUMMARY OF THE INVENTION

In accordance with the present invention, a communications bridge for a computer system interprets a "processor-assertable" address range associated with a data transfer as the Cartesian product of a "peripheral-accessible" address range and a command to perform a set of one or more data transfer operations, i.e., operations that can affect the form or the content of the data being transferred. The "processor-assertable address range" is essentially a "physical address range", the latter phrase being used in contradistinction to a software-addressable virtual address range. "Peripheral-accessible address range" refers to that portion of populated (e.g., with random access memory) physical address space accessible to a peripheral initiating a data transfer. "That portion" can be all or a subset of populated physical memory space.

For example, an n-bit processor-assertable address can be translated as a (n−1)-bit peripheral-accessible address combined with an instruction of whether or not to swizzle. Alternatively, a n-bit processor-assertable address can be translated as a pair of independent commands (for a total of four combinations) plus an (n−2)-bit peripheral-accessible address. One of the two most significant bits can indicate whether or not to swizzle, while the other of the two most significant bits can indicate whether or not to perform a cache snoop to maintain memory coherence. Herein, "data transfer operation" is any operation that affects a data transfer, including operations like swizzling that affect data, and cache snooping that affect the nature of the transfer rather than the data itself.

The communications bridge can include an interface for communicating with one or more microprocessors, a populated address space (e.g., memory or network addresses) and plural peripherals. The communications bridge includes means for detecting processor-assertable addresses in a data packet and mapping them to corresponding peripheral-accessible addresses and a set of one or more commands. The communications bridge includes means for executing (e.g., in the case of swizzling) or initiating (e.g., in the case of a cache snoop) the commands and accessing the indicated peripheral-accessible addresses.

Preferably, the communications bridge is programmable by the microprocessor. Specifically, the microprocessor can determine the mapping function of processor-assertable addresses to peripheral-accessible addresses and data transfer command sets. This allows the microprocessor to make greater use of the communications bridge in systems with smaller processor-assertable address spaces.

In the method of the invention, software executed on the microprocessor determines what action is to be taken with respect to the data to be transferred to or from a populated address space. To initiate the transfer, the microprocessor would normally communicate a processor-assertable address (corresponding to a peripheral-accessible address) to the peripheral that is to initiate the transfer. However, instead of supplying the peripheral-accessible address, the microprocessor provides a processor-assertable address corresponding to that peripheral-accessible address times the command (or set of commands) to be executed with respect to the transfer. When, during the data transfer, the communications bridge detects the processor-assertable address, it extracts the corresponding peripheral-accessible address and executes the indicated command. One of the possible commands is a "no-op", i.e., a command to not affect the data or its transfer; however, at least one command must affect the data transfer and, so, not be a no-op.

The invention accomplishes an indirect communication of commands from the microprocessor to the communications bridge by using processor-assertable address space for which there is no peripheral accessible equivalent. This allows the communications bridge to act as a proxy for the device driver in certain respects. Thus, the microprocessor can "delegate" certain functions to the communications bridge, despite the fact that that function is not explicitly provided for by the bus protocol. The command is communicated on a per-transaction basis, so it is effective even in a time-multiplexed environment.

DESCRIPTION OF THE PREFERRED EMBODIMENTS

Figure 1:
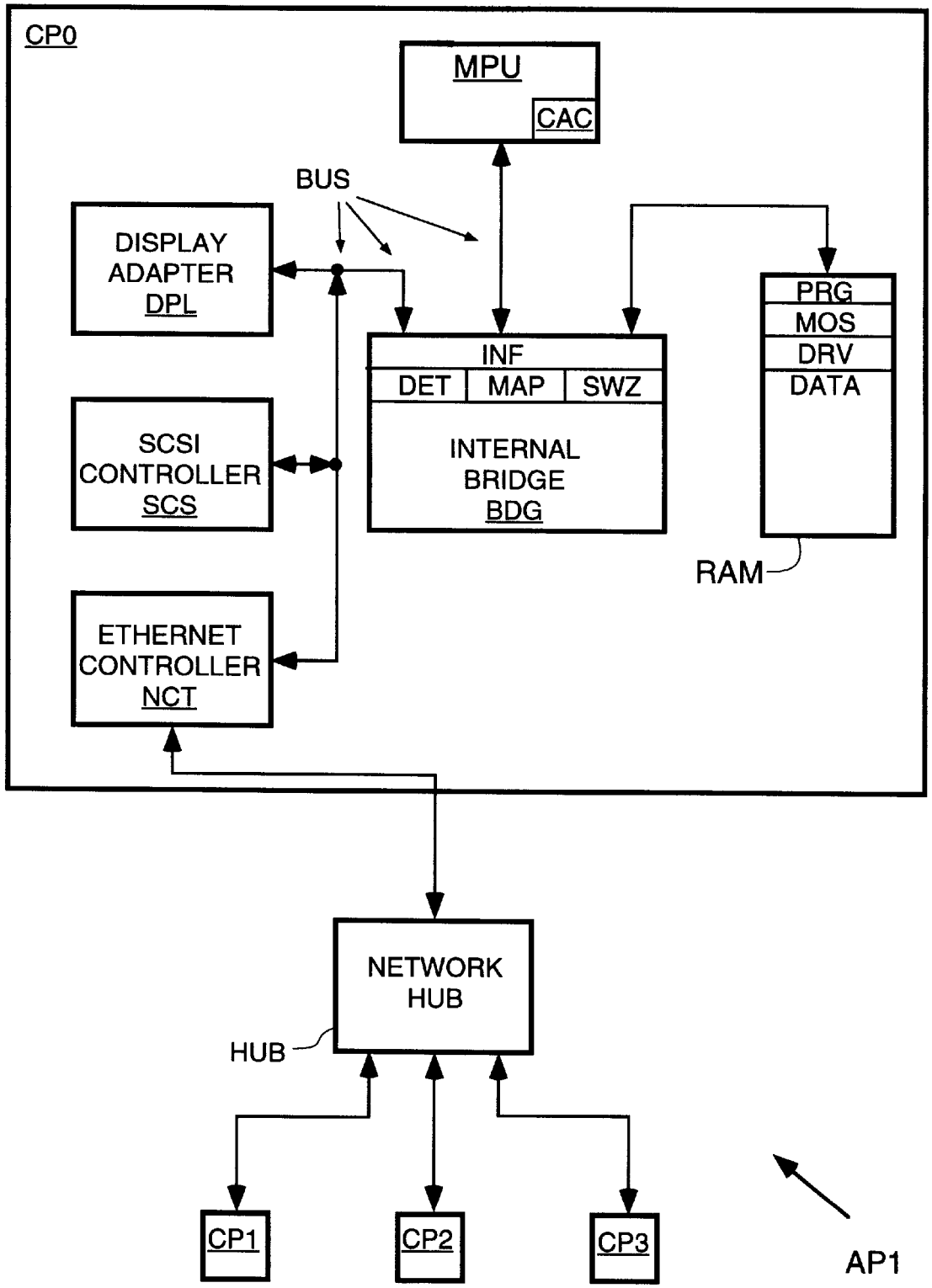
FIG. 1 is a computer system incorporating a bridge circuit in accordance with the present invention.

In accordance with the present invention, a computer network AP1 includes four computers CP0–CP3 and a network hub HUB, as shown in FIG. 1. Computer CP0 includes a microprocessor MPU, random access memory RAM, an internal bridge BDG, a big-endian display adapter DPL, a little-endian SCSI controller SCS, and a little-endian network controller NCT. Microprocessor MPU accesses memory RAM via a PCI bus BUS, which also provides the peripherals access to microprocessor MPU and memory RAM. Computer CP0 also includes unillustrated components including: a monitor driven by display adapter DPL, a SCSI hard disk and a SCSI CD-ROM driven by SCSI controller SCS, a keyboard, a mouse, a printer, etc.

Microprocessor MPU is a PowerPC 604e, developed by Apple, IBM, and Motorola, which can operate in either big-endian or little-endian mode. In the present case, microprocessor MPU operates in big-endian mode under a MacOS operating system MOS, developed by Apple Computer Corporation. When running under a Windows NT operating system, developed by Microsoft Corporation, such a processor typically operates in little-endian mode. Microprocessor MPU employs 32-bit addressing so as to define a four gigabyte (4 GB) processor-assertable address space. Memory RAM has a 1 GB capacity, which defines the populated address space for computer CP0, as well as the peripheral-accessible address space. A 1 GB memory can be addressed using 30 bits, leaving two unused logical address bits. Memory RAM stores operating system MOS, device drivers DRV, and programs PRG, as well as data DATA.

Communications bridge BDG includes a bus interface INF, an address detection function DET, a mapping function MAP, and a swizzle function SWZ. Bus interface INF provides for interfacing with microprocessor MPU, memory RAM, and peripherals DPL, SCS, and NCT. Address detection function DET detects processor-assertable address signals from MPU and peripherals DPL, SCS, NCT, used for initiating data transfers. Mapping function MAP converts detected processor-assertable addresses to a product space of peripheral accessible addresses and sets of data transfer commands.

For system AP1, these commands are "swizzle" versus "no swizzle" and "cache snoop" versus "no cache snoop". The "swizzle" and the "no-swizzle" operations affect the data transfer in that they affect the order of data transferred relative to the case where the opposite command is asserted. The "cache-snoop" and "no cache-snoop" signals affect the data transfer in that they potentially result in different memory locations (RAM or cache) being accessed and thus in a difference in the content of the data transferred.

In response to a "swizzle" command, mapping function MAP causes the data being transferred to pass through swizzle function SWZ, which effects the swizzling. In response to a "no swizzle" command, mapping function MAP directs the data so that it bypasses swizzle function SWZ. In response to a cache-snoop command, mapping function MAP causes interface INF to assert a cache-snoop enable signal to microprocessor MPU. In response to a "no cache snoop" command, mapping function MAP causes interface INF to assert a cache-snoop-disable signal to microprocessor MPU.

Figure 2:
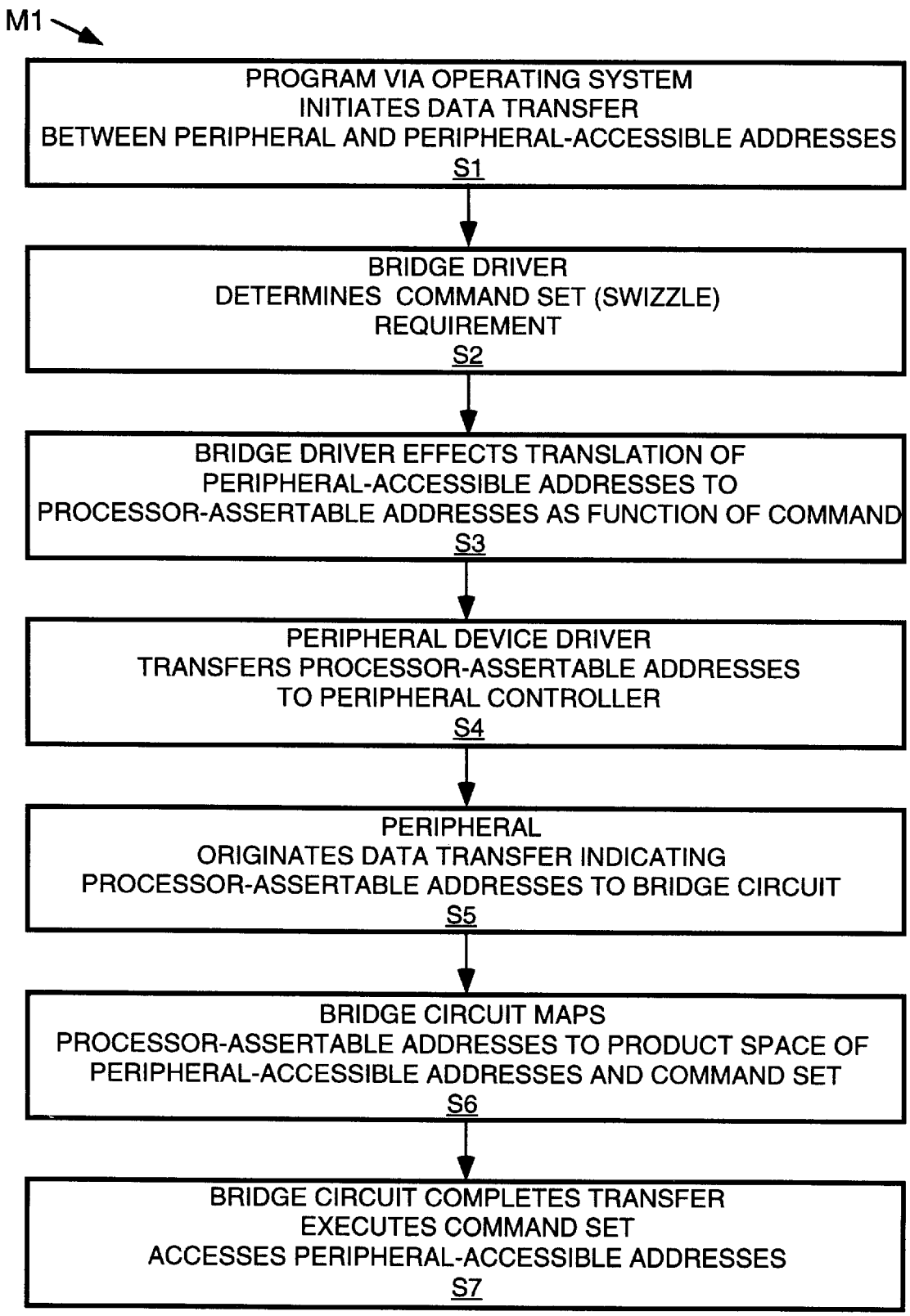
FIG. 2 is a flow chart of a method of the invention employed by the system of FIG. 1.

A method of the invention, as implemented by system AP1, is flow charted in FIG. 2. Prior to data transfers, a bridge installation program determines the size of peripheral-accessible memory and thus the number of bits available for data transfer commands. (Alternatively, the number of bits available for data transfer can be predetermined by the system designer.) In the present case, the two most significant processor-assertable address bits are available as command codes. Accordingly, the installation program causes microprocessor MPU to program communications bridge BDG with a mapping function that translates 32-bit processor-assertable addresses to 30-bit peripheral-accessible addresses and a set of two data transfer command options (swizzle versus non-swizzle and snooping versus no-snooping).

Instructions of programs PRG, operating system MOS, and drivers DRV are executed by microprocessor MPU at step S1. Drivers DRV include drivers for peripherals DPL, SCS, and NCT, as well as communications bridge BDG. When a program calls for a data transfer between a peripheral and memory RAM, operating system MOS determines the appropriate peripheral-accessible address range for the transfer. In the case of a transfer to memory RAM, the peripheral-accessible address range defines the location into which data from a peripheral is to be stored. In the case of a transfer from memory RAM, the peripheral-accessible address range defines the location in memory RAM from which data is to be read.

Operating system MOS attempts to convey the appropriate information about the desired data transfer to the driver for SCSI controller SCS. However, the information is intercepted by the driver for communications bridge BDG. The bridge driver is customized for the MacOS running on a PowerPC processor, and thus, in effect, "knows" that the processor is in big endian mode. The bridge driver is informed of the endianness of SCSI controller SCS during its installation. Thus, the bridge driver can determine whether swizzling is required, which in this case it is. The bridge driver can also determine from the type of transfer required that cache snooping should be enabled. Thus, the bridge driver determines a command set that includes both swizzling and snooping, at step S2.

As a function of the one command set determination, the bridge driver translates the peripheral-accessible address range to a processor-assertable address range, at step S3. In this case, a 1 in the most significant logical address bit corresponds to a swizzle command, while a 0 is the same position indicates a no-swizzle command. A 1 in the second most significant processor-assertable address bit corresponds to a snoop enable command, while a 0 in the same position indicates a "no-snoop" command. In the present case, both swizzling and snooping are desired. Accordingly, where the indicated peripheral-accessible address range is 0000010 . . . 0 to 0000100 . . . 0, the processor-assertable address range is 1100010 . . . 0 to 1100100 . . . 0.

Figure 3:
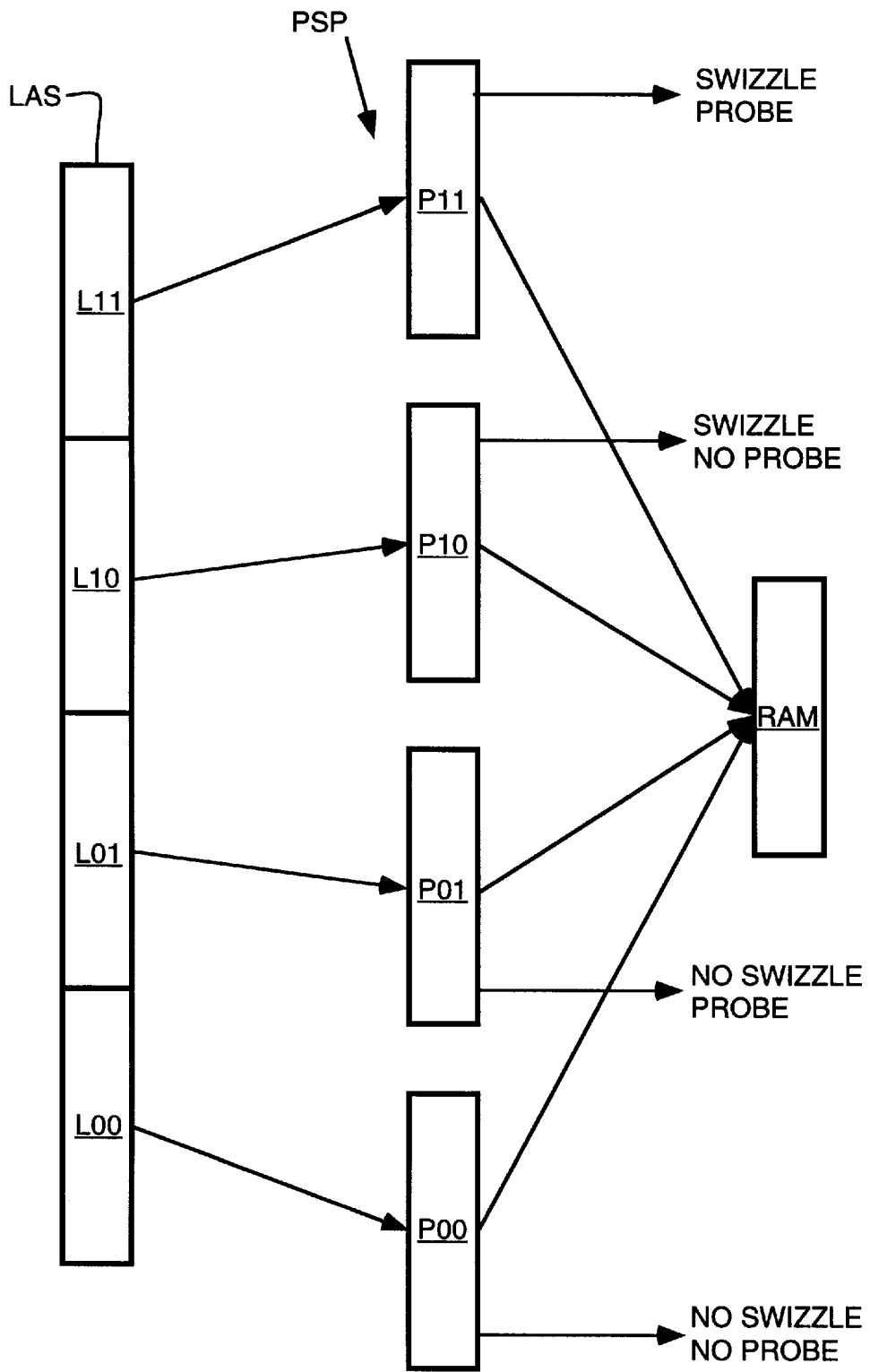
FIG. 3 is a schematic block diagram of the address mapping employed by the system of FIG. 1.

This translation can be understood with reference to FIG. 3, which shows processor-assertable address space LAS divided into four segments, L00, L01, L10, and L11, where the two numerical parts of a reference correspond to the two most significant bits for processor-assertable addresses in a segment. If there is to be no swizzling or snooping, the peripheral-accessible address range is translated to the corresponding range of segment L00. If there is to be no swizzling but snooping is enabled, the peripheral-accessible address range is translated to a corresponding range of segment L01. If there is to be swizzling but no snooping, the translation is to a range of segment L10. In the present case, there is swizzling and snooping, so the translation is to the corresponding range of segment L11.

The processor-assertable address range, rather than the original peripheral-accessible address range, is conveyed to the SCSI driver, which in turn conveys it to SCSI controller SCS, at step S4. SCSI controller SCS assumes control of PCI bus BUS, in accordance with the latter's protocol, and originates a data transfer indicating address range 1100010 . . . 0 to 1100100 . . . 0 to bridge circuit BDG, at step S5.

Communications bridge BDG receives the origination information at its interface INF. Detection function DET extracts the processor-assertable address range from the original information. Mapping function MAP maps the logical address range to the product space of the peripheral-accessible addresses and the command set, at step S6.

This mapping is illustrated in FIG. 3, in which the four processor-assertable address segments are mapped to respective product space segments P00, P01, P10, P11, of product space PSP. The addresses of each product space segment are mappable 1:1 to addresses of the peripheral-accessible address space constituted by memory RAM. However, the product space segments differ in the command sets indicated: product space segment P00 indicates no swizzle and no snoop; product space segment P01 indicates snoop but no swizzle; product space segment P10 indicates swizzle but no snoop; and product space segment P11 indicates both swizzle and snoop.

Communications bridge BDG completes the desired data transfer at step S7. In doing so, it accesses the peripheral-accessible address range of memory RAM as determined by mapping function MAP; this is the same peripheral-accessible address range as originally determined by operating system MOS. Depending on the direction of the transfer, memory RAM can either be the source or destination of the data, and SCSI controller SCS can serve the complementary function.

In completing the data transfer, communications bridge BDG effects or initiates the data transfer operations indicated by the command set extracted from the processor-assertable address range. In this case, mapping function MAP causes data to pass through swizzle function SWZ to be swizzled. If no swizzling is to occur, mapping function directs data directly out interface INF without passing though swizzle function SWZ. In addition, mapping function MAP causes interface INF to assert a snoopenable signal to microprocessor MPU. If cache CAC of MPU has data relevant to the data transfer occurring, the appropriate action is taken to ensure valid data transfers and cache coherency.

If the endianness of the controller SCS and microprocessor had been the same, the most significant bit of the processor-assertable address would be set to 0. Mapper function MAP would indicate no swizzling. The data would pass through swizzle function unchanged. Whether or not the data is swizzled, it arrives at the memory location originally intended by operating system MOS.

For transfers between display adapter DPL and memory RAM, the second most significant bit of the address range is set to 0, indicating that cache snooping is to be disabled. In general, a cache does not include display data. Accordingly, the processor-assertable addresses used for transfers to big-endian display adapter DPL begin with 00, indicating no swizzling and no cache snoop. Mapping function MAP causes the data transferred to bypass swizzle function SWZ and a cache-snoop enable signal is asserted to microprocessor MPU.

It should be noted that the peripheral does not need to "know" that the processor-assertable address range indicates a data transfer command or that there is no location in memory RAM with the processor-assertable address indicated to the peripheral. In effect, the microprocessor is communicating with the bridge through the peripheral on a per packet basis. Even with bus multiplexing, the bridge can determine when to swizzle and when to snoop. Thus, the marriage of peripherals and microprocessors in mixed-endian environments is made more convenient.

While the invention requires an addressable space, it does not require that space to be random access memory. For example, the address space can be a set of network identification numbers. For example, network AP1 provides 256 network addresses, only four of which are used. Thus, there are six address bits that can be used for command set communication. In this case, microprocessor can perform the translation of network identification numbers to a product space. Network hub HUB can map the product space addresses to network identification numbers and commands for handling data. From this perspective, computers CP1–CP3 are peripherals and network hub is the bridge circuit for inter-computer communications.

The invention provides for different types of peripheral-accessible address spaces and different methods of assigning unused processor-assertable address space to commands that affect data transfers. Different numbers of unused address bits can be used to indicate commands. Format translation operations can be indicated. Commands relating to data transfer operations other than cache snooping and data format translations are provided for. These and other variations upon and modifications to the illustrated embodiment are provided for by the present invention, the scope of which is limited only by the following claims.

What is claimed is:

1. A data communications bridge for managing communication between a microprocessor, an addressable assembly, and plural peripherals, said microprocessor defining a processor-assertable address space of processor-assertable addresses, said addressable assembly defining a populated address space of populated addresses including a peripheral-accessible address space of peripheral-accessible addresses, said peripherals initiating communications with said addressable assembly in part by transmitting indications of processor-assertable address ranges, said bridge comprising:

interface means for receiving data from and transmitting data to said microprocessor, said addressable assembly, and said peripherals, and for receiving address indications from said peripherals;

address detection means for detecting a processor-assertable address range indication transmitted by one of said peripherals;

mapping means for selecting a peripheral-accessible address range and a data operation as a function of said processor-assertable address range, said peripheral-accessible address range being selected from said peripheral accessible addresses, said data operation being selected from a set of plural data operations, said mapping means being coupled to said address detection means for receiving said address range indication, said mapping means being coupled to said interface means and said address detection means, said mapping means causing said peripheral-accessible address range to be accessed; and operator means for performing or causing to be performed on a data transfer said data operation, said operator means being coupled to said mapping means.

2. A data communications bridge as recited in claim 1 wherein the mapping effected by said mapping means is programmable accordingly to programming codes transmitted by said microprocessor and received by said interface means.

3. A data communications bridge as recited in claim 1 wherein said data operations collectively provide for swizzling and not swizzling.

4. A data communications bridge as recited in claim 1 wherein said data operations collectively provide for cache snooping and not cache snooping.

5. A method of managing communication between a peripheral and an addressable assembly, said method comprising the steps of:

a) having a microprocessor direct said peripheral to originate a data transfer with said addressable assembly at a specified processor-assertable address range;

b) having a communications bridge select a peripheral-accessible address range and a data operation as a function of said processor-assertable address range, said peripheral-accessible address range being selected from a populated address range of said addressable assembly, said data operation being selected from a set of plural data operations; and c) completing said data transfer by accessing said peripheral-accessible address range and executing said data operation.

6. A method as recited in claim 5 further comprising a step of, before step a), having said microprocessor program said communications bridge to determine said function.

7. A method as recited in claim 5 wherein said set of data operations collectively include swizzling and not swizzling.

8. A method as recited in claim 5 wherein said set of data operations collectively include cache snooping and not cache snooping.

* * * * *